United States Patent [19]
Inoue

[11] Patent Number: 5,594,909
[45] Date of Patent: Jan. 14, 1997

[54] FILE I/O CONTROL DEVICE WRITING BLOCKS TO FASTER DEVICE FIRST AND CANCELING EXCLUSIVE LOCK AS EACH BLOCK IS WRITTEN

[75] Inventor: Hiroyumi Inoue, Tokyo, Japan

[73] Assignee: NEC Corporation, Tokyo, Japan

[21] Appl. No.: 910,847

[22] Filed: Jul. 6, 1992

[30] Foreign Application Priority Data

Jul. 5, 1991 [JP] Japan ..................... 3-190864

[51] Int. Cl.⁶ .............. G06F 13/00; G06F 13/38
[52] U.S. Cl. ............ 395/872; 395/856; 395/726
[58] Field of Search ................... 395/425, 600, 395/650, 872, 726, 856

[56] References Cited

U.S. PATENT DOCUMENTS

| | | | |
|---|---|---|---|
| 3,683,418 | 8/1972 | Martin | 395/650 |
| 4,358,829 | 11/1982 | Branigin et al. | 395/275 |
| 5,034,915 | 7/1991 | Styrna et al. | 395/275 |
| 5,060,144 | 10/1991 | Sipple et al. | 395/650 |
| 5,220,653 | 6/1993 | Miro | 395/826 |
| 5,251,318 | 10/1993 | Nitta et al. | 395/725 |
| 5,276,840 | 1/1994 | Yu | 395/425 |

OTHER PUBLICATIONS

C. J. Date, "An Introduction to Database Systems", vol. II, 1984 pp. 83–103.
Halici et al. "Concurrency Control in Distributed Databases through Time Intervals and Short-Term Locks", IEEE, 1989, v. 15, pp. 994–1003.

*Primary Examiner*—Thomas O. Lee
*Assistant Examiner*—D. Dinh
*Attorney, Agent, or Firm*—Foley & Lardner

[57] ABSTRACT

A file input/output control device for a computer system of the present invention can, even in an environment where magnetic storage and semiconductor storage devices with quite different access speeds are concurrently used as the external storage, cancel exclusive control for film blocks without deteriorating the performance of higher speed storage. For this purpose, this device is provided with block write means to write the blocks in the buffer to the external storage block by block when a quiet point of the processing program is established and exclusion cancellation means to, each time the block write means terminates writing for a block, cancel exclusive control for that block.

8 Claims, 9 Drawing Sheets

FILE I/O CONTROL DEVICE WRITING BLOCKS TO FASTER DEVICE FIRST AND CANCELING EXCLUSIVE LOCK AS EACH BLOCK IS WRITTEN

BACKGROUNDS OF THE INVENTION

1. Field of the Invention

This invention relates to a computer system provided with an external storage commonly used by a plurality of programs (application programs), and particularly relates to a file input/output control device for a computer system capable of reducing the time required for canceling exclusive control of file blocks.

2. Description of the Prior Art

When a plurality of application programs using a common file on an external storage are run concurrently, exclusive control is applied to avoid confusion in file contents. A file on an external storage is typically divided into a plurality of blocks, each of which contains a plurality of data records, and each block serves as a unit for input to or output from a buffer and a unit for exclusive control.

The exclusive control has various peculiar drawbacks. Now a conventional exclusive control method for file blocks is described.

The processing of quiet point establishment at an end of the application program after a plurality of blocks in a file on an external storage are transferred to a buffer for update or other processing is conventionally performed as described below. Note here that the blocks transferred to the buffer and subjected to update or other processing have been already placed under exclusive control.

An exclusive control means first activates a block write means by specifying all the blocks updated by the application program. The block write means writes a plurality of blocks in the buffer one by one to the file.

Upon completion of writing of all the blocks updated by the application program, the exclusive control means activates the exclusion cancellation means.

The exclusion cancellation means then cancels exclusive control for all the blocks used in that application at a time.

This conventional example is characterized by the bulk cancellation of exclusive control for all the blocks used in one application program, which results in an advantage of high efficiency and high speed processing.

As described above, a conventional exclusion cancellation method for file blocks is advantageous in that the bulk cancellation of exclusive control enables high speed processing. However, with processing speed of computers becoming higher, this advantage does not appear so attractive now. On the contrary, drawbacks as shown below are pointed out.

With the recent progress in semiconductor technology, external storages using semiconductors (semiconductor storages) have been put into practice and used in the same way as the conventional magnetic storage. Magnetic storages and semiconductor storages are both used as the external storage. In many cases, a single application uses file blocks on both devices.

Since a semiconductor storage does not have any mechanical drive, it is capable of much faster access compared with a magnetic storage. However, in a conventional exclusion cancellation method for file blocks, exclusive control is canceled at a time after writing all the blocks updated by the application program to the file on the external storage, and if there are both magnetic and semiconductor storage blocks, the semiconductor storage block is kept under exclusion mode still after completion of writing in shorter time with waiting for completion at the magnetic storage. This impairs improvement of efficiency. In other words, even if a semiconductor storage is introduced, it cannot contribute to a higher efficiency with utilization of the file on the semiconductor storage concurrently by a plurality of programs since the time while the blocks are under exclusive control cannot be reduced. This invention mainly addresses cancellation of exclusive control for a block when a quiet point is established.

The conventional system has an advantage in that once a quiet point is established upon the occurrence of a demand for establishment, a demand for rollback will never occur in the writing process to the buffer and releasing of exclusive control. Accordingly, when the exclusive control is released at any time after writing in the buffer, atomicity will not be lost. However, in practice, it is possible to cause failure of the external storage device or hang-up of the electronic computer during writing to the buffer. It thus becomes necessary to provide servers which can guarantee atomicity.

This nature is referred to as "durability." In order to assure durability, when failure is caused during the process of establishing the quiet point, the system automatically executes a rollback.

In the prior art, since the exclusive control is maintained during writing in the buffer, rollback can be executed even when a failure occurs. Even when a failure occurs during the release of the exclusive control after completion of the buffer writing process, since writing in the buffer has already been completed, atomicity can be guaranteed.

Another method for assuring atomicity upon occurrence of failure during buffer writing is to write in the buffer for which writing is held incomplete after recovery of the failure. To do this, it becomes necessary to store the content of the buffer in a non-volatile memory. In general, a non-volatile memory is expensive or low-speed, such as an external storage device, and has poor applicability in practical use.

However, owing to recent development of the electronic computer and lowering of cost for high speed non-volatile storage devices, such as an external storage device employing a semiconductor memory, it has become possible to guarantee atomicity by the foregoing method.

SUMMARY OF THE INVENTION

An object of the present invention is to provide a file input/output control device for a computer system which is, even in an environment where storages with different access speeds such as magnetic and semiconductor storages are concurrently used as the external storage, capable of canceling exclusive control for file blocks without deteriorating the performance of higher speed storages.

According to a preferred embodiment of the present invention to attain the object, a file input/output control device for a computer system comprises an external storage to store a file commonly accessed from a plurality of processing programs, read means to read a file in the external storage block by block, buffer means to store the blocks read by the read means, exclusion means to place the blocks in the buffer means under exclusive control block by block, block write means to write each of the blocks in the buffer means to the external storage when a quiet point of the processing program is established, and exclusion cancellation means to, each time the block write means terminates writing for a block, cancel exclusive control for that block.

According to a further preferred embodiment, the external storage comprises a plurality of storages with different processing speeds and there are further block data storage means to store data to indicate the source storage of the block read from the file in the storage means and write request means which refers to the block data storage means and instructs the block write means to write the blocks starting from the blocks whose source storage is the storage means with the faster processing speed.

Another object of the present invention is to provide a file input/output control device for a computer system which enables effective restoration without wasting the processing results so far as far as possible even in case where the system goes down due to any system failure.

A file input/output control device for a computer system of the present invention to attain this object comprises temporary storage means to temporarily store the updated blocks in the buffer means, save means to save the applicable blocks to the temporary storage means at the time of writing of the blocks stored in the buffer means to the external storage, and restoration means to restore in case of failure by rewriting the blocks in the temporary storage means to the buffer means.

According to another preferred embodiment, the temporary storage means comprises a nonvolatile storage medium.

According to still another preferred embodiment, a file input/output control device for a computer system further comprises erase means to erase the blocks in the temporary storage means upon completion of rewriting of the blocks in the temporary storage means to the buffer means.

Other objects, characteristics and effects of the present invention will be clarified by the detailed description below.

DESCRIPTION OF THE PREFERRED EMBODIMENT

Figure 1:
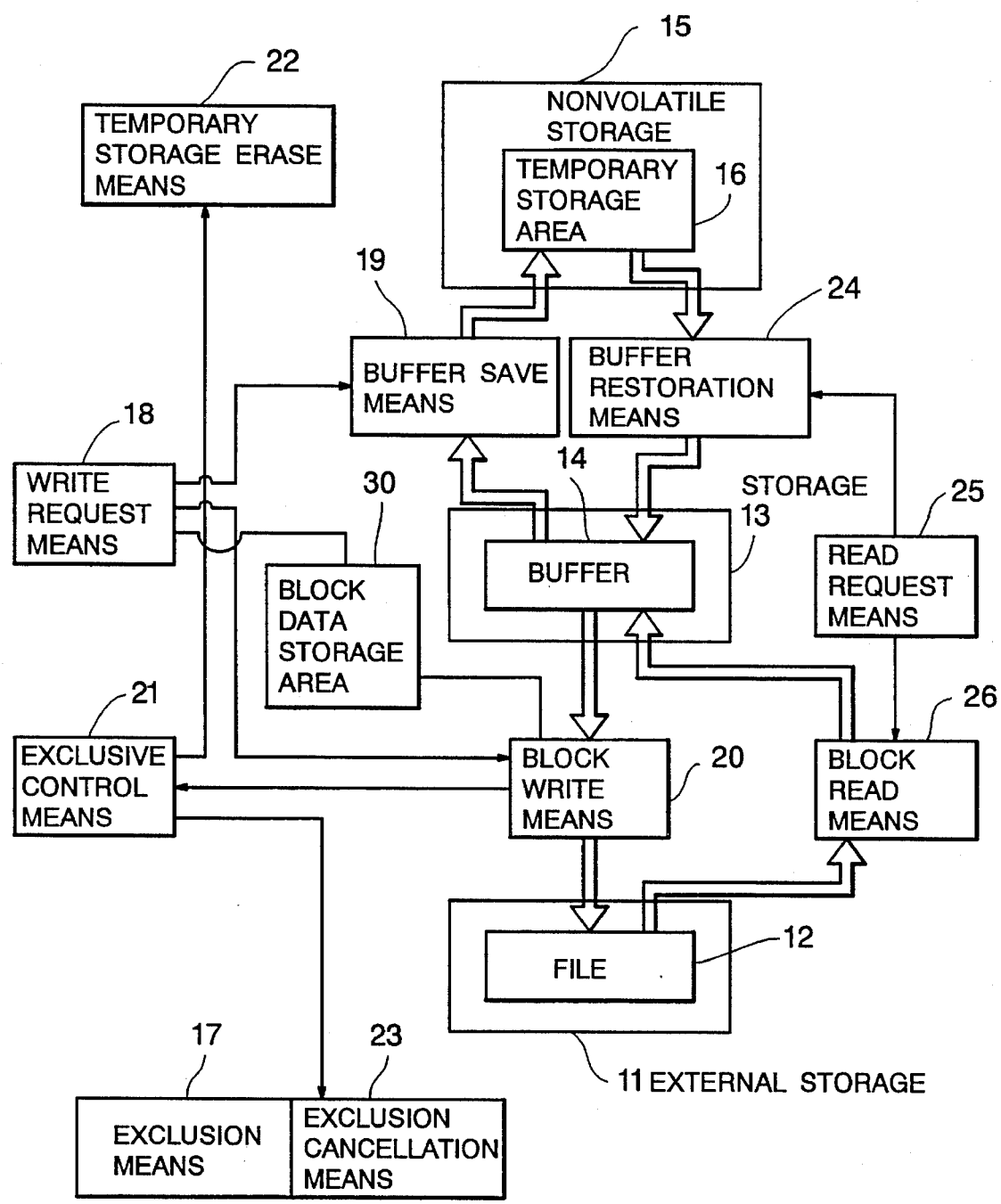
FIG. 1 is a diagram to show the configuration of an embodiment of a file input/output control device where the exclusive control method of the present invention is applied.

Referring to FIGS. 1 to 11, a preferred embodiment of the present invention will be described below, FIG. 1 shows the configuration of a file input/output control device to which the exclusive control method according to an embodiment of the present invention is applied. This embodiment is also capable of block contents restoration in case of system failure.

Figure 2:
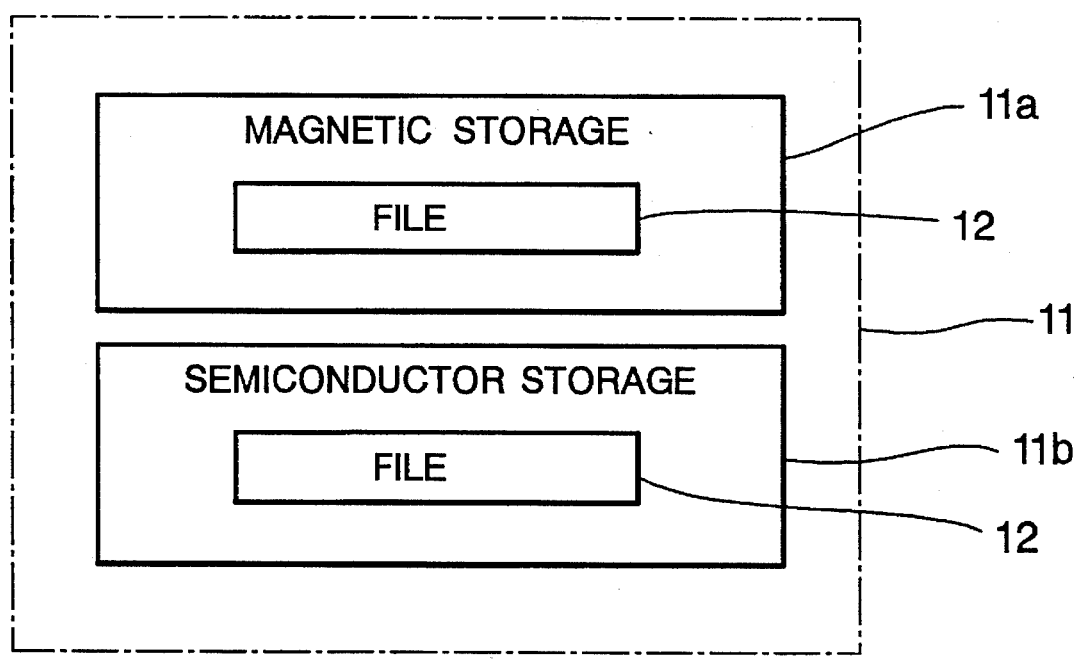
FIG. 2 is a block diagram to show the configuration of a external storage.
Figure 11:
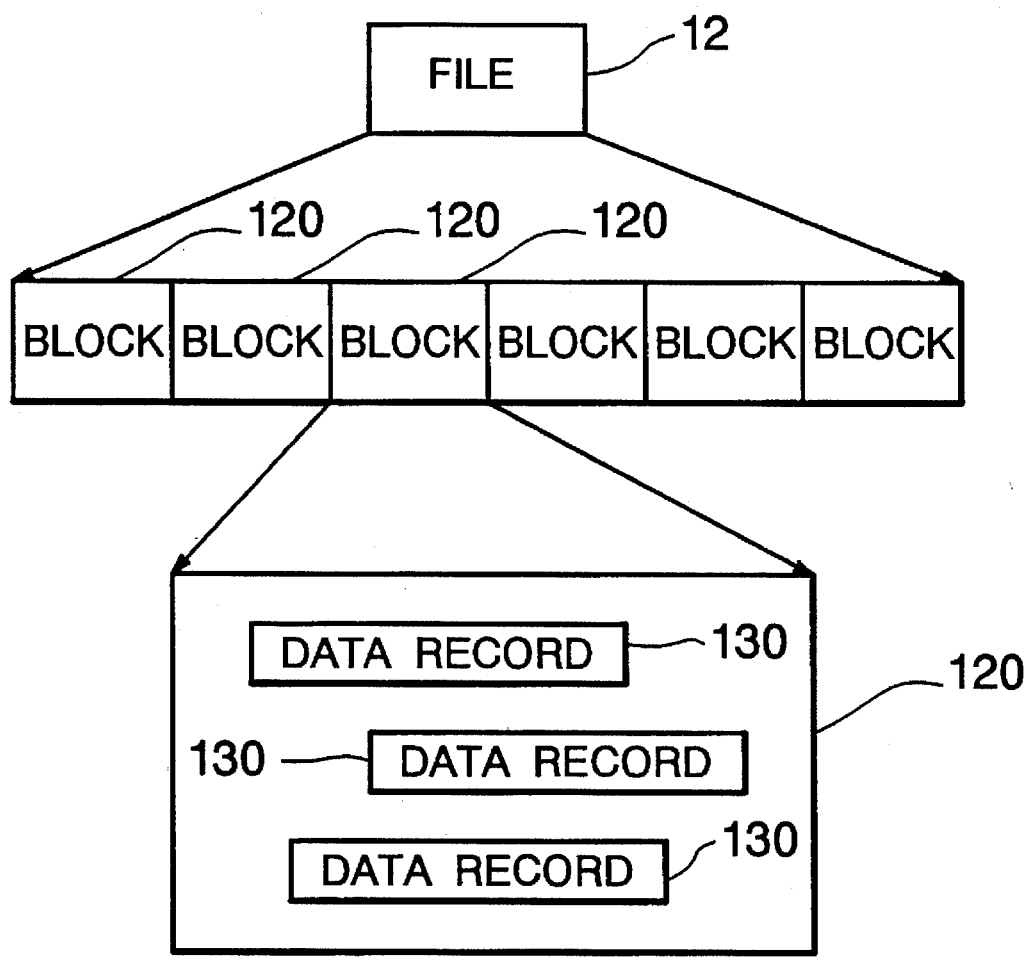
FIG. 11 is a diagram to show an example of configuration for a file in the external storage.

In FIG. 1, the file input/output control device comprises, as its part to store and keep data, an external storage 11 storing a file 12 used by a plurality of application programs (processing programs), a storage 13 where a buffer 14 for actual block update or other processing is assigned, a nonvolatile storage 15 where a temporary storage area 16 is assigned for backing up in case of failure, a block data storage area 30 to store data for each block. The external storage 11 is provided, as shown in FIG. 2, with a magnetic storage 11a and a semiconductor storage 11b, each of which stores a file 12. The file 12 consists, as shown in FIG. 11, of a plurality of blocks 120 each containing a plurality of data records 130. The block 120 serves as a unit of input to and output from the buffer 14 and also a unit of exclusive control.

A plurality of application programs which commonly use a file on the external storage 11 update or otherwise process data records 130 on the buffer 14 in the storage 13. The nonvolatile storage 15 may be a RAM(Random Access Memory) with power backup or an EEPROM(Electronic Erasable and Programmable ROM). The block data storage area 30 stores the type (magnetic storage 11a or semiconductor storage 11b) of the applicable external storage used as the source storage of the blocks read or written and, if the blocks are in the magnetic storage 11a, write positions.

In addition, this file input/output control device has, as its functions, exclusion means 17 to exclusively control each block, buffer save means 19 to save the blocks in the buffer 14 to the temporary storage area 16, block write means 20 to write the blocks in the buffer 14 to the file 12, write request means 18 to control the buffer save means 19 and the block write means 20, temporary storage erase means 22 to erase the blocks in the temporary storage area 16, exclusion cancellation means 23 to cancel exclusive control for a block, exclusive control means 21 to control the temporary storage erase means 22 and the exclusion cancellation means 23, buffer restoration means 24 to restore the contents in the buffer 14 from the contents in the temporary storage area 16, block read means 26 to read blocks from the file 12 in the external storage 11 and store them to the buffer 14 and the read request means 25 to control the buffer restoration means 24 and the block read means 26.

Next, the operation of a file input/output control device configured as above is described below.

Figure 3:
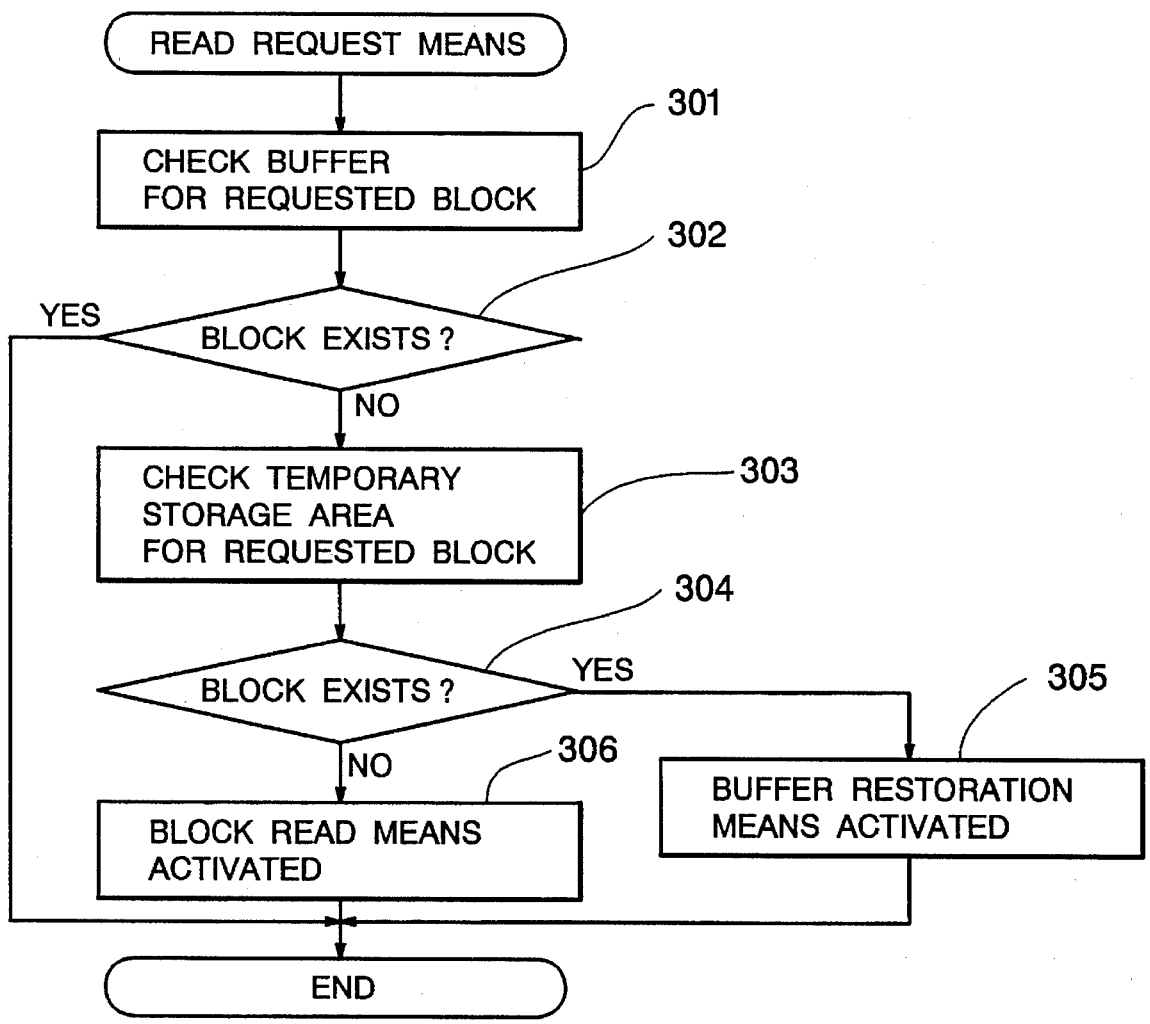
FIG. 3 is a flowchart to illustrate the reading processing by read request means.

FIG. 3 is a flowchart to illustrate processing at the read request means 25 when an application program reads a block from the file 12 on the external storage 11. Firstly, the read request means 25 checks whether buffer 14 has the acquired block (Step 301). If that block is on the buffer 14 ("YES" for Step 302), the processing ends since there is no need of reading the requested block from the file 12 on the external storage 11.

If the required block is not found in Step 302, the temporary storage area 16 in the nonvolatile storage 15 is checked for the requested block (Step 303). If the requested block exists on the temporary storage area 16 ("YES" for Step 304), the buffer restoration means 24 is activated so that the requested block is fetched from the temporary storage area 16 and stored in the buffer 14 (Step 305). If the required block is not found in Step 304, the block read means 26 is activated so that the requested block is read from the file 12 in the external storage 11 and stored to the buffer 14 (Step 306).

Suppose an application program reads a plurality of blocks in the file 12 on the external storage 11 and updates or otherwise processes them at the buffer 14 in the storage 13 and then establishes a quiet point when the processing ends. Note that the block transferred to the buffer 14 and subjected to update or other processing has been already placed under exclusive control by the exclusion means 17.

Figure 4:
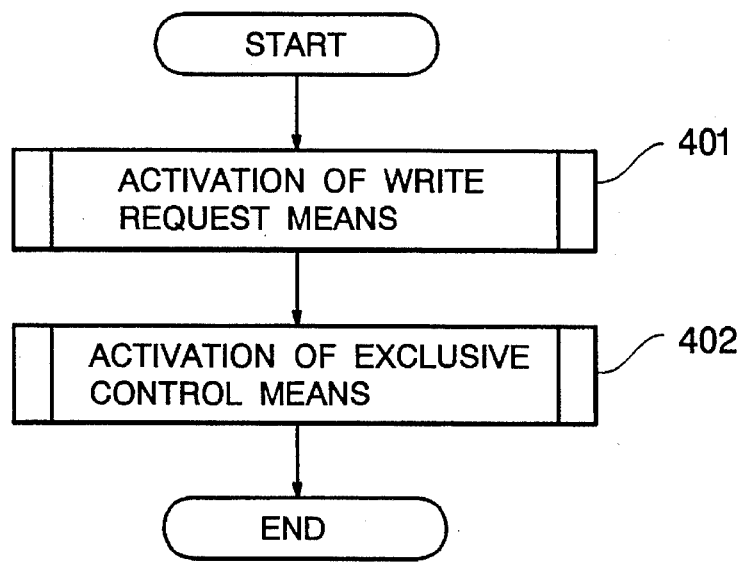
FIG. 4 is a flowchart to show the processing when a quiet point is established in the embodiment shown in FIG. 1.
Figure 5:
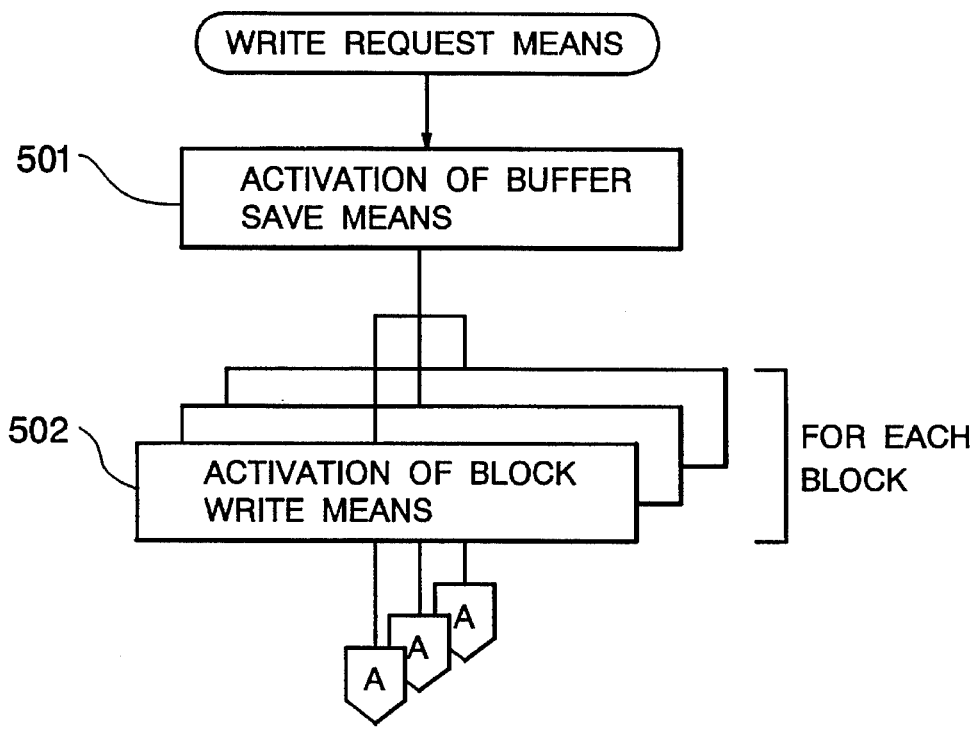
FIG. 5 is a flowchart to show the processing by the write request means.

FIG. 4 shows the processing of quiet point establishment. The write request means 18 (Step 401) first, and then the exclusive control means 21 (Step 402) are activated. Thereafter, as shown in FIG. 5, the write request means 18 activates the buffer save means 19 (Step 501). The buffer save means 19 transfers all the blocks in the buffer 14 updated in its transaction to the temporary storage area 16.

When the buffer save means 19 terminates its processing, the write request means 18 activates the block write means 20 with specifying a block for each block in the buffer 14 updated in the transaction (Step 502). The block write means 20 in turn writes the blocks from the buffer 14 to the file 12 in the external storage 11 as specified.

For proper block writing in Step 502 as shown in FIG. 5, the order of block writing as described below is preferred.

Figure 9:
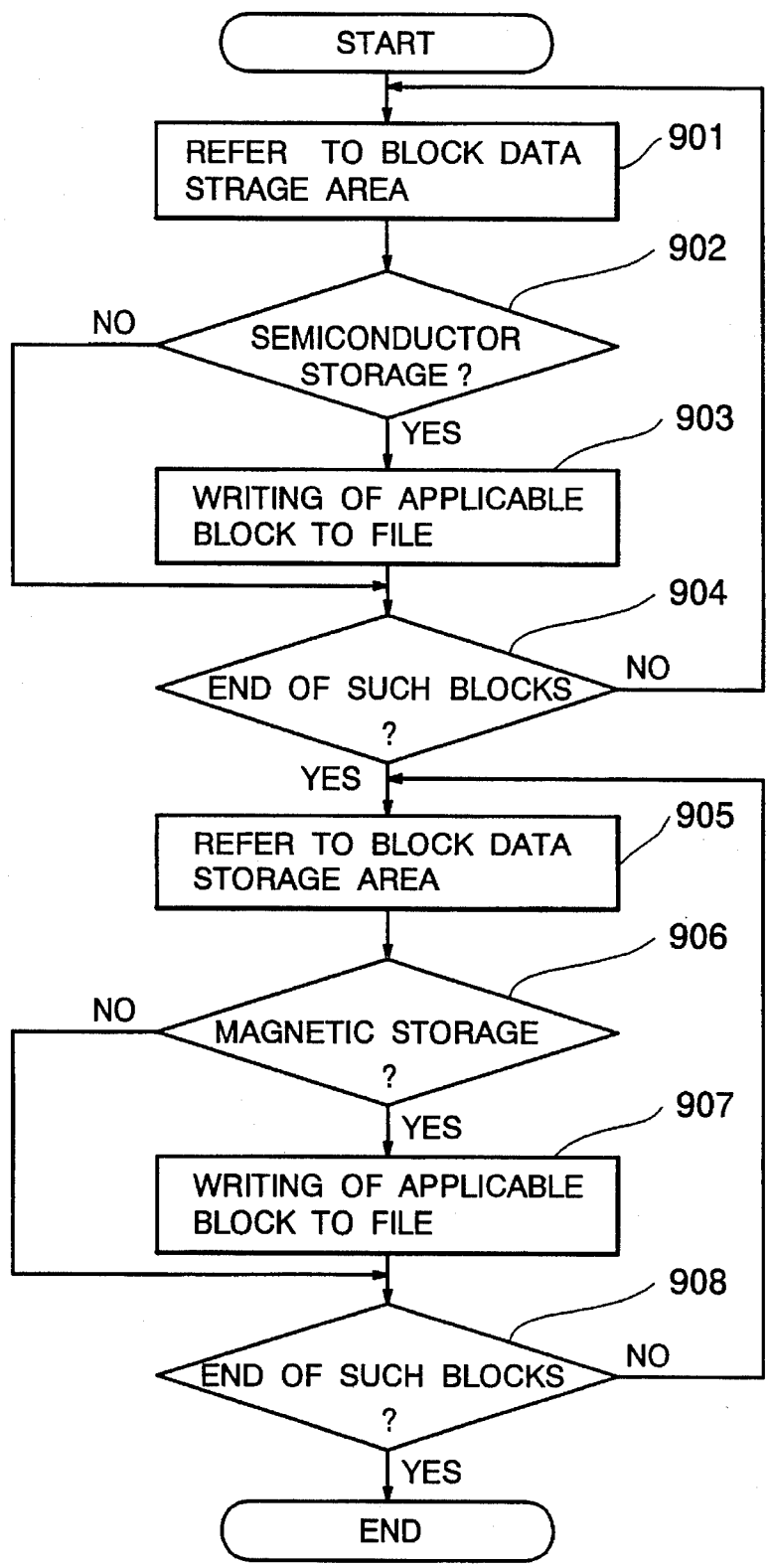
FIG. 9 is a flowchart to control the order of block writing corresponding to the access speed of the applicable external storage.

Primarily, if there are some blocks with different access speeds (blocks on the magnetic storage 11a and the semiconductor storage 11b in the external storage 11), the block write means 20 is activated for the blocks in the order of access speeds of their source storages starting from the fastest one. This enables block writing for a storage with the higher access speed to terminate earlier and thereby causes the exclusion cancellation as described later to be earlier. FIG. 9 shows the processing in this case. The write request means 18 refers to the block data storage area 30 (Step 901), judges whether the source storage of the specified block is the semiconductor storage 11b or not (Step 902), and if the source storage is the semiconductor storage 11b, writes the block to the file 12 (Step 903). These steps are repeated as far as any block whose source storage is the semiconductor storage 11b can be found (Step 904). Next, in Steps 905 to 908, the specified blocks whose source storage is the magnetic storage 11a are subjected to the similar writing processing. This realizes effective block writing.

Figure 10:
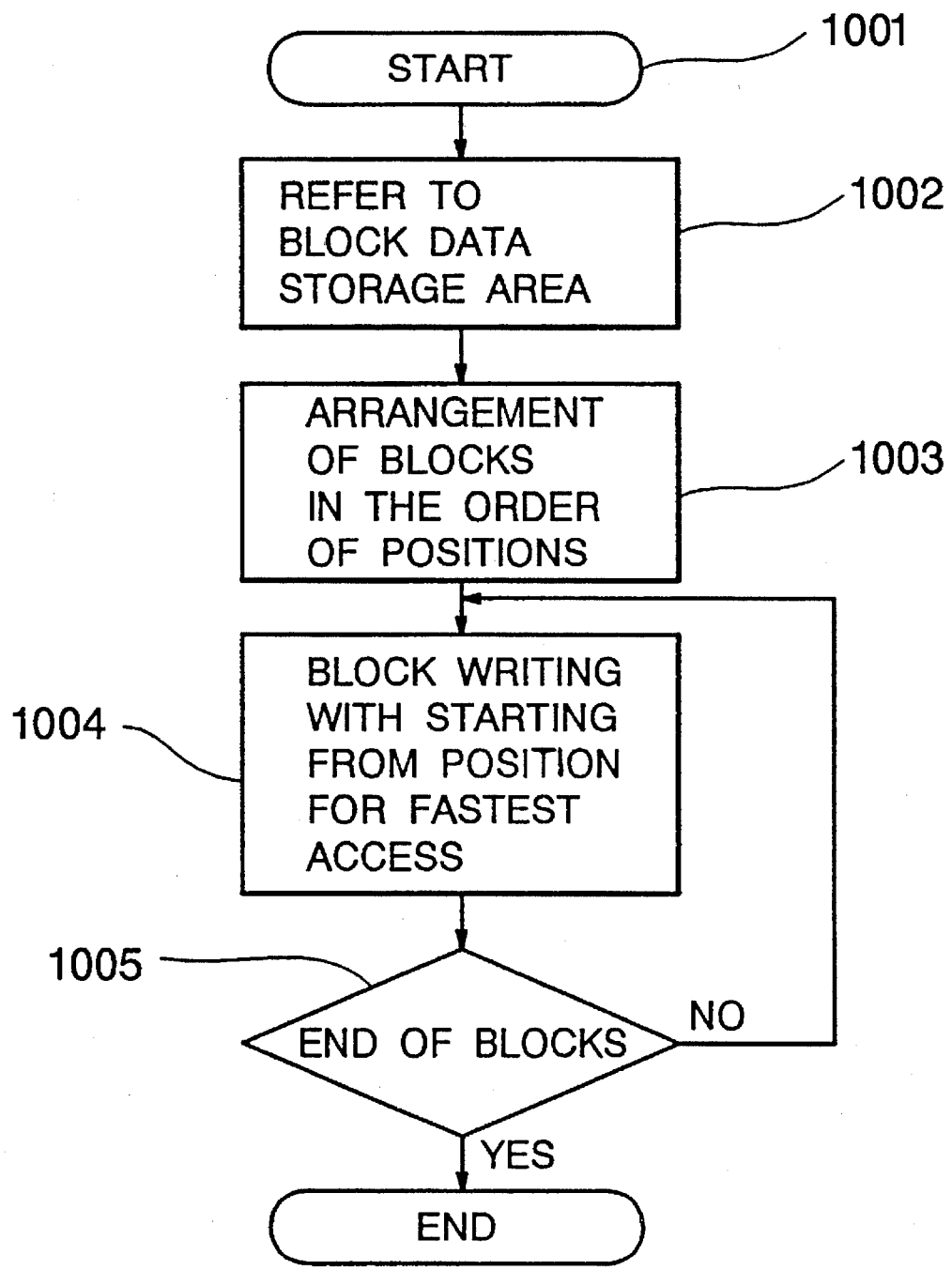
FIG. 10 is a flowchart to illustrate the control of the order for block writing corresponding to the write position in the same external storage.

Secondly, if there are a plurality of blocks having the same source storage (in case of the magnetic storage 11a), the block write means 20 is activated for the blocks in the order of physical positions in the magnetic storage 11a. For example, a block at an outer side of the magnetic disk is written earlier. This reduces the seek operation at the magnetic storage 11a with a mechanical drive, which results in faster processing. FIG. 10 shows the processing in this case. Firstly, the write request means 18 refers to the block data storage area 30 (Step 1001). The blocks whose source storage is the magnetic storage 11a are arranged in the order of write positions on the magnetic storage 11a (Step 1002). Then, in the order of accessibility of write positions starting from the position which can be accessed the most quickly, the blocks are written to the file 12 (Step 1003). These steps are repeated until all the blocks are processed (Step 1005).

Figure 6:
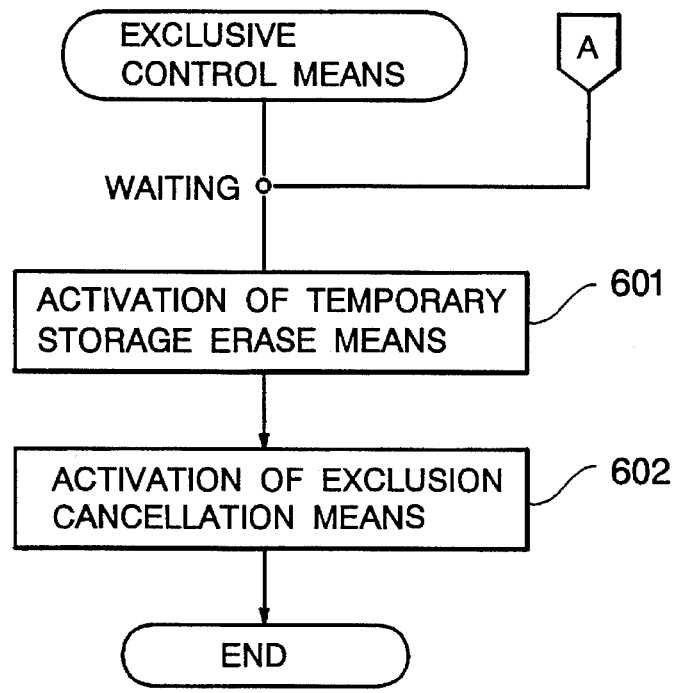
FIG. 6 is a flowchart to show the processing by the exclusive control means.

On the other hand, as shown in FIG. 6, the exclusive control means 21 waits for completion of writing by the block write means 20. When it detects that the block write means 20 terminates the processing, it activates the temporary storage erase means 22 (Step 601). The temporary storage erase means 22 erases the applicable blocks on the temporary storage area 16 on the nonvolatile storage 15.

Then, the exclusive control means 21 activates the exclusion cancellation means 23 (Step 602). The exclusion cancellation means 23 cancels the exclusive control for the blocks for which the writing is completed.

Since the exclusion cancellation means 23 operates concurrently for the blocks, the blocks for which processing by the block write means 20 terminates in shorter time, i.e. the blocks on the semiconductor storage 11b, can be released from the exclusive control earlier.

Restoration processing in case of system down due to system failure or other causes during the processing above is now described for two cases.

Figure 7:
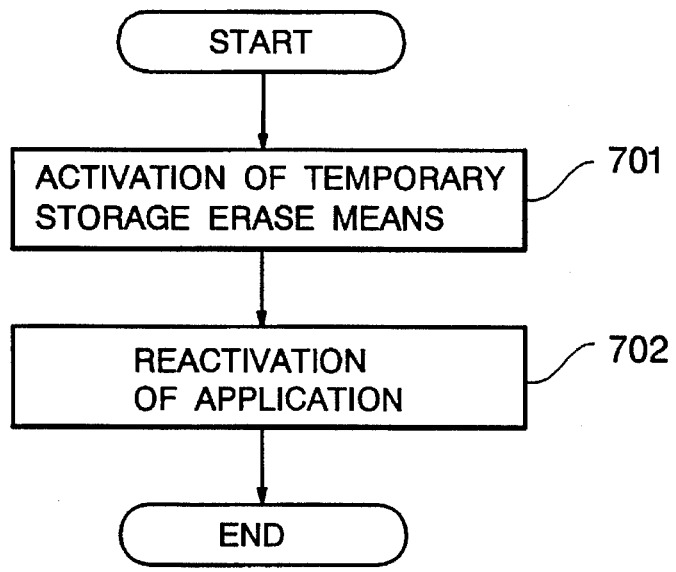
FIG. 7 is a flowchart to illustrate the restoration processing after system down.

The first case is for system down during the processing by the buffer save means 19. In this case, the contents in the buffer 14 are destroyed or returned to the initial status and they cannot be used. The contents in the temporary storage area 16 cannot be used either because whether the transfer of blocks in Step 501 in FIG. 5 has been completed or not cannot be assured. Accordingly, as shown in FIG. 7, the temporary storage erase means 22 is activated so as to erase the contents in the temporary storage area 16 (Step 701) and the application program is reactivated (Step 702). This brings the system to the status before starting to use the application program so that the user processes the transaction again.

Figure 8:
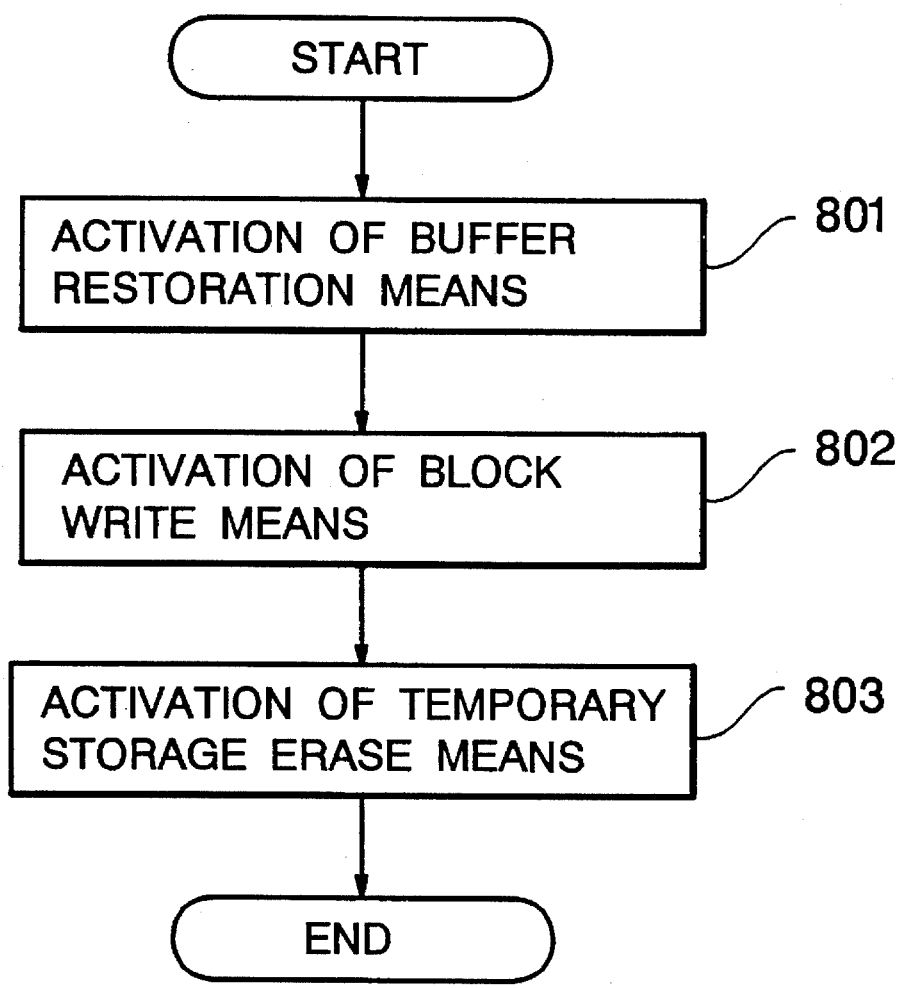
FIG. 8 is a flowchart to illustrate the restoration processing after system down.

Second case is for restoration in case of system down during the processing by the block write means 20. In this case, too, the contents in the buffer 14 are destroyed or returned to the initial status and they cannot be used. However, the contents in the temporary storage area 16 can be used because the processing has been already completed. Accordingly, as shown in FIG. 8, the buffer restoration means 24 is activated by the read request means 25 so as to transfer the blocks from the temporary storage area 16 to the buffer 14 (Step 801). Then, the block write means 20 is activated and the writing to the file 12 is performed again (Step 802). Finally, the temporary storage erase means 22 is activated so as to erase the contents in the temporary storage area 16 (Step 803). In this case, the system can be restored without wasting the results of transaction processing so far.

As described above, in the file input/output control device according to this embodiment, writing from the buffer to the file 12 in the external storage 11 is performed for each block, and, each time writing of a block is completed, exclusion is canceled for that block; this reduces the time of exclusive control for the blocks on the storage capable of high speed processing such as a semiconductor storage 11b. This can realize concurrent use of the blocks by a plurality of application programs.

Even when a failure is caused during the foregoing process, which makes it impossible to write the buffer 14 in the file 12, since the buffer 14 which is incomplete in writing is temporarily stored in the temporary storage area 16, atomicity can be assured by writing back the content of the temporary buffer in the file 12 after recovery.

Obviously various modifications can be made to the embodiment described above. It is intended to cover in the appended claims all such modifications as fall within the true spirit and scope of the invention.

What is claimed is:

1. A file input/output control device for a computer system comprising:

an external storage to store a file commonly accessed by a plurality of processing programs;

read means for reading a plurality of blocks in said file in said external storage block by block;

buffer means for storing the blocks read by said read means;

exclusion means for placing each of the blocks stored in said buffer means under exclusive control block by block;

block write means for writing each of the blocks stored in said buffer means to said external storage when a quiet point of one of said processing programs is established;

exclusion cancellation means for, each time said block write means finishes writing one of the blocks, canceling exclusive control for the one block;

temporary storage means for storing temporarily the blocks in said buffer means;

save means for saving the blocks to said temporary storage means before the block write means writes the blocks stored in said buffer means to said external storage;

buffer restoration means for writing each of said blocks stored in said temporary storage means into said buffer means in case of failure in writing each of said blocks into said external storage by said block write means;

wherein said external storage includes a plurality of storages with different processing speeds; and further comprising block data storage means for storing data to indicate a one of the storages in said external storage from which the block was read; and write request means for referring to said block data storage means and instructing said block write means to write the blocks starting from the blocks whose indicated one of the storages has the faster processing speed.

2. A file input/output control device for a computer system of claim 1 wherein said block data storage means includes means for storing as data the block write positions on said external storage; and wherein said write request means includes means for referring to said block data storage means and instructing said block write means to write the blocks in the order of accessibility of write positions starting from a position the most quickly accessed.

3. A file input/output control device for a computer system of claim 1, wherein said write means writes said more than one block back to a same one of said storages during the quiet point in an order of physical positions of said more than one block in said same one of said storages, when said write means determines that more than one block came from a same one of said storages.

4. A file input/output control device for a computer of claim 1, wherein said temporary storage means comprises a nonvolatile storage medium.

5. A file input/output control device for a computer system comprising:

an external storage to store a file commonly accessed by a plurality of processing programs;

read means for reading a plurality of blocks in a file in said external storage block by block;

buffer means for storing the blocks read by said read means;

exclusion means for placing each of the blocks stored in said buffer means under exclusive control block by block;

block write means for writing each of the blocks stored in said buffer means to said external storage when a quiet point of one of said processing programs is established;

exclusion cancellation means for, each time said block write means finishes writing a one of said blocks, canceling exclusive control for the one block;

temporary storage means for storing temporarily the blocks stored in said buffer means;

save means for saving at least one of the blocks to said temporary storage means before the block write means writes the at least one block stored in said buffer means to said external storage;

restoration means for restoring in case of failure by rewriting the blocks in said temporary storage means to said buffer means;

wherein said external storage includes a plurality of storages with different processing speeds; and further comprising block data storage means for storing data to indicate a one of the storages in said external storage from which the block was read; and write request means for referring to said block data storage means and instructing said block write means to write the blocks starting from the blocks whose indicated one of the storages has the faster processing speed.

6. A file input/output control device for a computer system of claim 5 further comprising erase means for erasing the blocks in said temporary storage means upon completion of rewriting of the blocks in said temporary storage means to said buffer means.

7. A file input/output control devices for a computer of claim 5 wherein said temporary storage means comprises a nonvolatile storage medium.

8. A file input/output control device for a computer system of claim 5:

wherein said block data storage means includes means for storing as data the block write positions on said external storage; and wherein said write request means includes means for referring to said block data storage means and instructing said block write means to write the blocks in the order of accessibility of write positions starting from a position the most quickly accessed.

* * * * *